(12) United States Patent
Dhanabalan et al.

(10) Patent No.: US 9,398,333 B2
(45) Date of Patent: Jul. 19, 2016

(54) RECORDING CONTENT MULTIPLE TIMES AND RESERVING A COPY OF THE CONTENT FOR CHECK OUT

(71) Applicant: Verizon Patent and Licensing Inc., Arlington, VA (US)

(72) Inventors: Sankar Ram Dhanabalan, Irving, TX (US); Sameer Gavade, Irving, TX (US); Srirama R. Kalidindi, Flower Mound, TX (US); Sanjay Ahuja, Irving, TX (US); Anjaneya Pericharla, Irving, TX (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 0 days.

(21) Appl. No.: 14/491,409

(22) Filed: Sep. 19, 2014

(65) Prior Publication Data

US 2016/0088348 A1    Mar. 24, 2016

(51) Int. Cl.
| | | |
|---|---|---|
| *H04N 21/21* | (2011.01) |
| *H04N 21/442* | (2011.01) |
| *H04N 7/16* | (2011.01) |
| *H04N 21/454* | (2011.01) |
| *H04N 21/24* | (2011.01) |
| *H04N 21/4627* | (2011.01) |
| *H04N 21/8355* | (2011.01) |
| *H04N 5/913* | (2006.01) |
| *H04N 21/4147* | (2011.01) |
| *H04N 21/258* | (2011.01) |
| *H04N 21/433* | (2011.01) |
| *H04N 21/266* | (2011.01) |
| *H04N 21/426* | (2011.01) |

(52) U.S. Cl.
CPC ......... *H04N 21/44204* (2013.01); *H04N 5/913* (2013.01); *H04N 7/163* (2013.01); *H04N 21/2407* (2013.01); *H04N 21/25816* (2013.01); *H04N 21/26606* (2013.01); *H04N 21/4147* (2013.01); *H04N 21/4263* (2013.01); *H04N 21/4334* (2013.01); *H04N 21/454* (2013.01); *H04N 21/4627* (2013.01); *H04N 21/8355* (2013.01)

(58) Field of Classification Search
None
See application file for complete search history.

(56) References Cited

U.S. PATENT DOCUMENTS

2013/0104175 A1* 4/2013 Applegate ............ H04N 21/231
725/87
2014/0325057 A1* 10/2014 Borawski ................ H04L 67/22
709/224

OTHER PUBLICATIONS

Wikipedia, "Set-top box", http://en.wikipedia.org/wiki/Set-top_box, Jul. 18, 2014, 7 pages.
Wikipedia, "Digital video recorder", http://en.wikipedia.org/wiki/Digital_video_recorder, Aug. 1, 2014, 16 pages.

* cited by examiner

*Primary Examiner* — Cai Chen

(57) ABSTRACT

A device may be configured to receive a request to record content. The device may receive copy control information associated with the content that indicates a first quantity of copies of the content that the device is permitted to make available for check out from each recording of the content. The device may determine to record the multiple times based on the first quantity of copies failing to satisfy a particular value. The device may record the content multiple times using multiple tuners based on the request. The device may make a second quantity of copies of the content available for check out to at least one client device based on recording the content the plurality of times. The second quantity of copies may be greater than the first quantity of copies.

20 Claims, 12 Drawing Sheets

RECORDING CONTENT MULTIPLE TIMES AND RESERVING A COPY OF THE CONTENT FOR CHECK OUT

BACKGROUND

A user may use a client device (e.g., a smart phone, a tablet computer, etc.) to download content stored by a set-top box. For example, the set-top box may record a TV program, and the user may download the TV program onto the client device to watch at a later time. The content may be associated with a restriction that limits the number of copies of the content that may be made and distributed to client devices by the set-top box.

DETAILED DESCRIPTION OF PREFERRED EMBODIMENTS

The following detailed description of example implementations refers to the accompanying drawings. The same reference numbers in different drawings may identify the same or similar elements.

Content broadcast to a media client (e.g., a set-top box) may be associated with a restriction that limits a quantity of copies of the content that may be made from a single recording of the content. Accordingly, a situation may arise where a client device (e.g., a smart phone, a tablet computer, etc.) requests to check out a copy of the content from the media client, but the media client cannot provide a copy of the content to the client device because a maximum number of copies of the content have already been checked out to other client devices.

Some implementations described herein may record the same content multiple times, via multiple tuners, to increase the quantity of copies permitted to be offered for check out to client devices. Accordingly, more copies of the content may be checked out, thereby reducing the risk that a copy of the content will not be available for check out. Furthermore, some implementations described herein may reserve a copy of a content for a client device when a permitted quantity of copies are already checked out so that the client device may check out a copy of the content when a copy of the content becomes available.

Figure 1A:
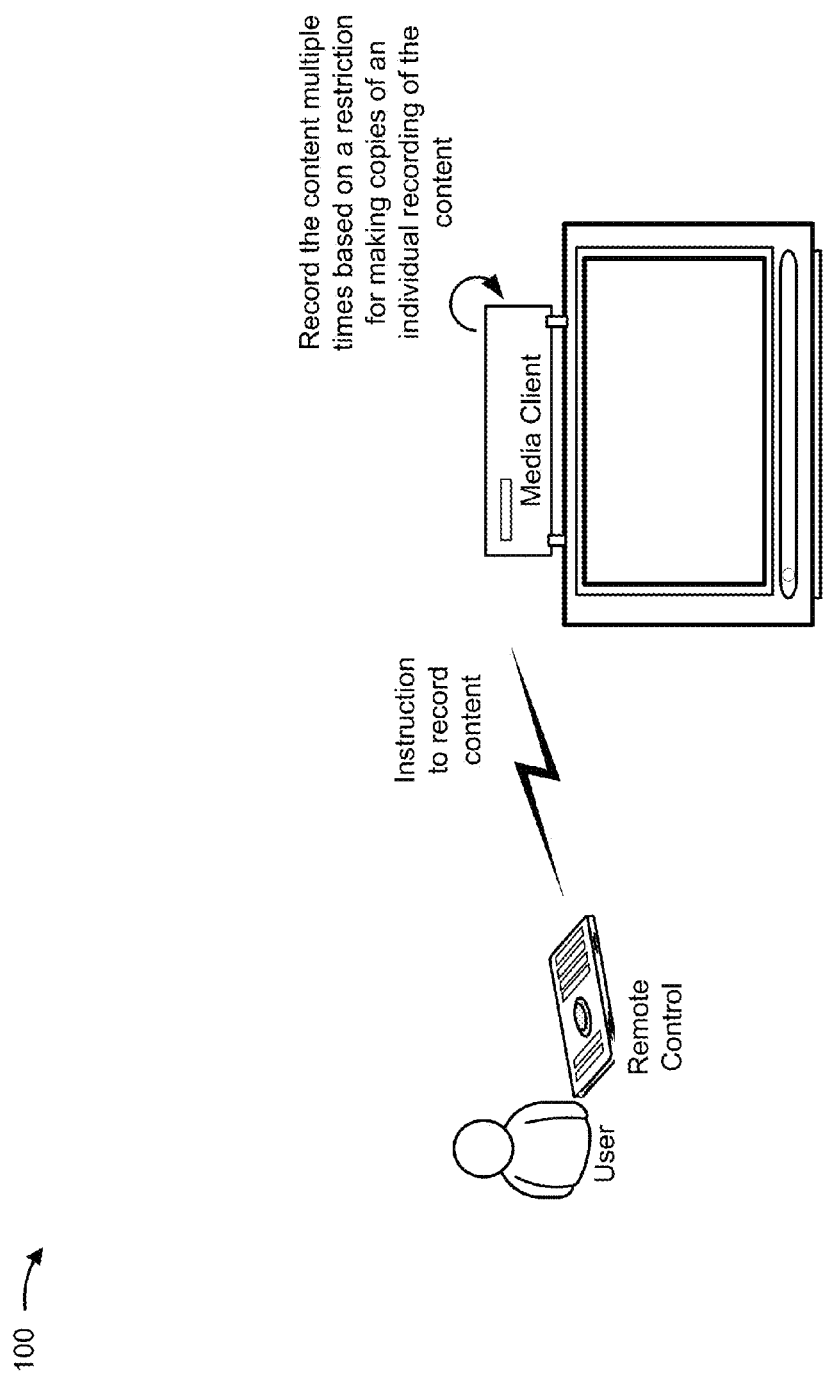
FIGS. 1A and 1B are diagrams of an overview of an example implementation described herein.
Figure 1B:
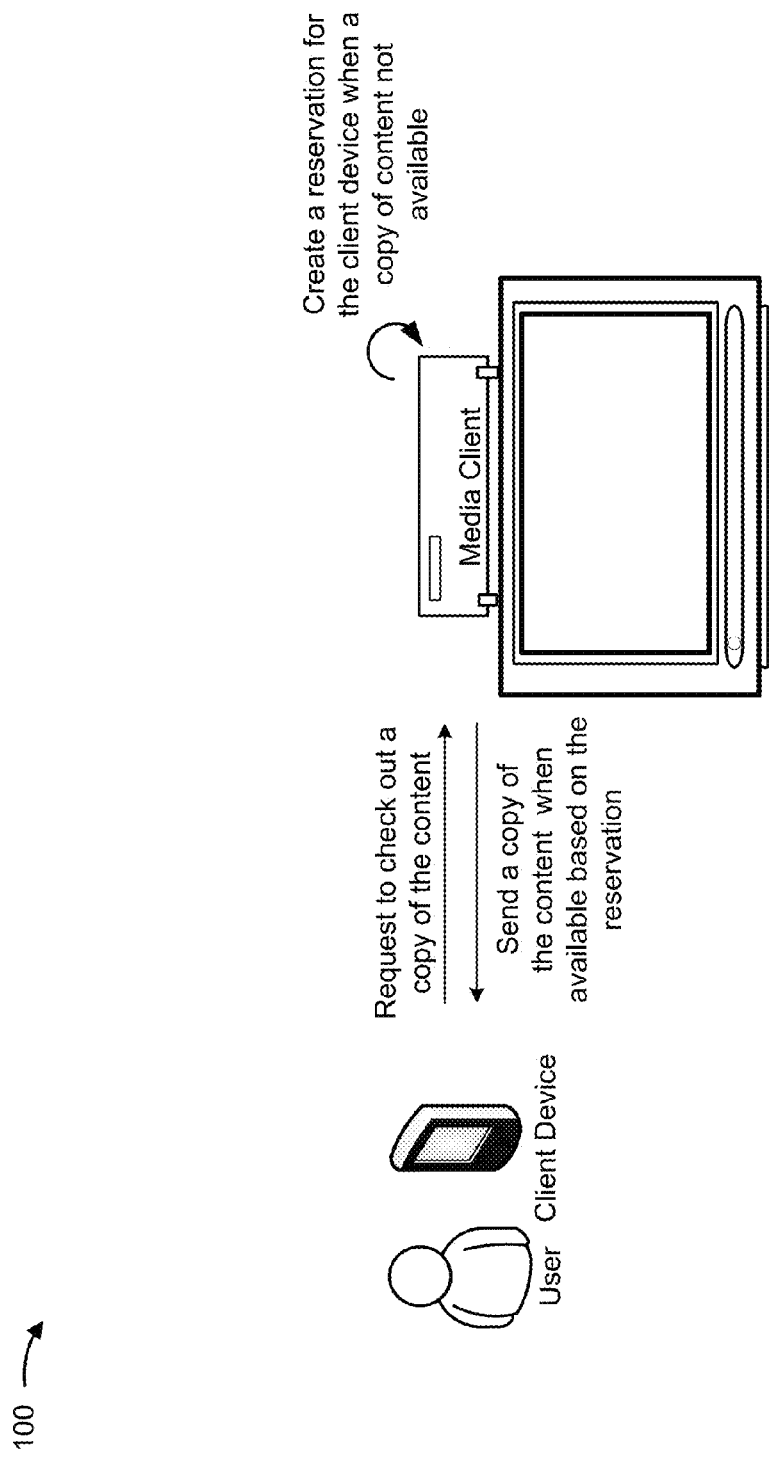

FIGS. 1A and 1B are diagrams of an overview of an example implementation 100 described herein.

As shown in FIG. 1A, a user may use a remote control to send an instruction to a media client to record content broadcast to the media client (e.g., a television program, a movie, or the like). Assume the content is associated with copy control information that permits only a particular quantity of copies of the content be made, from a single recording of the content, for check out from the media client at any given time. The media client may determine that the particular quantity of copies is not enough (e.g., does not satisfy a threshold level) and may determine to record the content multiple times using multiple tuners. In some implementations, the media client may check whether there are enough tuners available and/or enough memory available to record the content multiple times. Additionally, or alternatively, the media client may work with connected media clients (e.g., media clients associated with a same household, media client associated with a same organization, etc.) to record the content multiple times.

Accordingly, the media client may be permitted to offer a quantity of copies for check out that is equal to the particular quantity of copies multiplied by the number of times the content is recorded. In this way, the media client may be permitted to offer more copies of the content for check out than if the content was recorded only one time, thereby reducing the risk that a copy of the content will not be available for check out when a client device requests a copy of the content.

However, as shown in FIG. 1B, a situation may still arise when a copy of the content is not available to be checked out. For example, assume a client device sends a request to check out a copy of the content to the media client, and the media client determines that a copy of the content is not available to be checked out. For instance, all the copies of the content that the media client is permitted to offer for check out may already be checked out to other client devices.

Rather than simply refusing to send a copy of the content to the client device, the media client may create a reservation for the client device that will hold a copy of the content for the client device when a copy of the content becomes available (e.g., when one of the checked-out copies of the content is checked in).

When a copy of the content becomes available, the media client may send the client device a notification that a copy of the content is now available to be checked out. If a user of the client device still wants to check out a copy of the content, the client device may resend a request to check out a copy of the content to the media client. The media client may receive the request and determine that a copy of the content is being held for the client device. Accordingly, the media client may send a copy of the content to the client device.

In this way, the client device may receive a copy of the content even though no copies of the content were available when the client device originally requested to check out a copy of the content.

Figure 2:
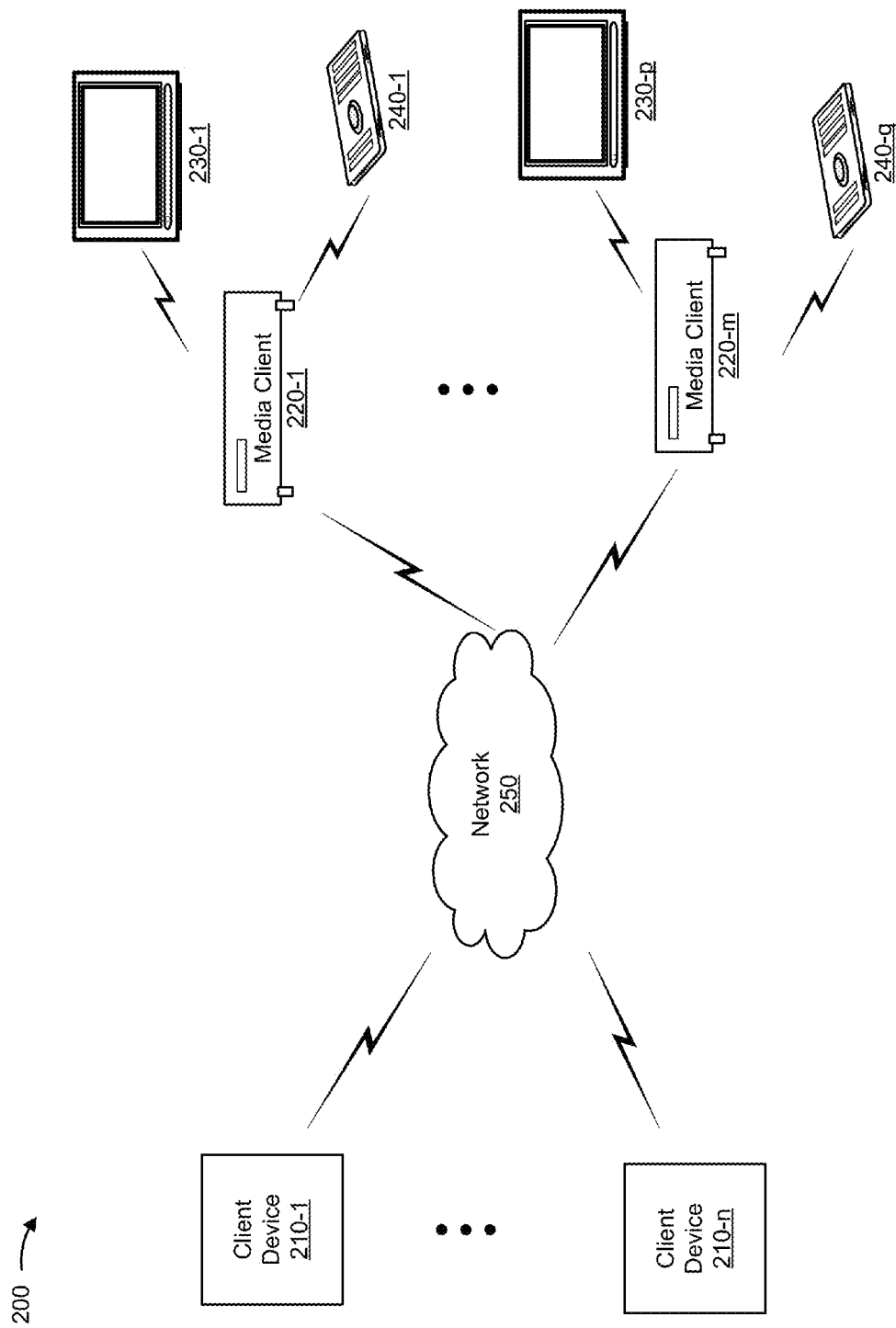
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more client devices 210-1 through 210-$n$ (n≥1) (hereinafter referred to collectively as "client devices 210," and individually as "client device 210"), media clients 220-1 through 220-$m$ (m≥1) (hereinafter referred to collectively as "media clients 220," and individually as "media client 220"), display devices 230-1 through 230-$p$ (p≥1) (hereinafter referred to collectively as "display devices 230," and individually as "display device 230"), remote controls 240-1 through 240-$q$ (q≥1) (hereinafter referred to collectively as "remote controls 240," and individually as "remote control 240"), and/or a network 250. Devices of environment 200 may interconnect via wired connections, wireless connections, or a combination of wired and wireless connections.

Client device 210 may include a device capable of receiving, generating, storing, processing, and/or providing information. For example, client device 210 may include a communications and/or computing device, such as a mobile phone (e.g., a smart phone, a radiotelephone, etc.), a laptop computer, a tablet computer, a handheld computer, a gaming device, or a similar device. In some implementations, client device 210 may receive information from and/or transmit information to another device in environment 200. In some implementations, client device 210 may download copies of content recorded by media client 220.

Media client 220 may include a device capable of receiving, transmitting, and/or processing multimedia content and providing the multimedia content to a user (e.g., via display device 230). Examples of media client 220 may include a set-top box, a casting stick (e.g., a high-definition media interface (HDMI) dongle), a computer, a cable card, a gaming device, a portable electronic device, and/or another type of device capable of receiving, transmitting, and/or processing multimedia content and providing the multimedia content to a user. In some implementations, media client 220 may record content and provide copies of the content to client devices 210. Media client 220 may include one or more tuners used to receive content broadcast to media client 220.

Display device 230 may include any digital or analog display that is capable of presenting audio and/or video content provided by media client 220. Display device 230 may include technologies, such as cathode ray tube (CRT) displays, liquid crystal displays (LCDs), light-emitting diode (LED) displays, plasma displays, etc. Examples of display device 230 may include a television, a projector, a computer monitor, and/or another type of device capable of presenting audio and/or video content.

Remote control 240 may include a device that allows a user to control programming, applications, and/or content displayed on display device 230 via interaction with media client 220. Remote control 240 may transmit signals, such as, for example, infrared signals, to a signal receiver associated with media client 220. Remote control 240 may take the form of a standard remote, a keyboard, a smart phone, etc. Any function, described herein, as being performed by remote control 240, may be performed directly on media client 220 using, for example, one or more buttons on media client 220.

Network 250 may include one or more wired and/or wireless networks. For example, network 250 may include a cellular network (e.g., an LTE network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
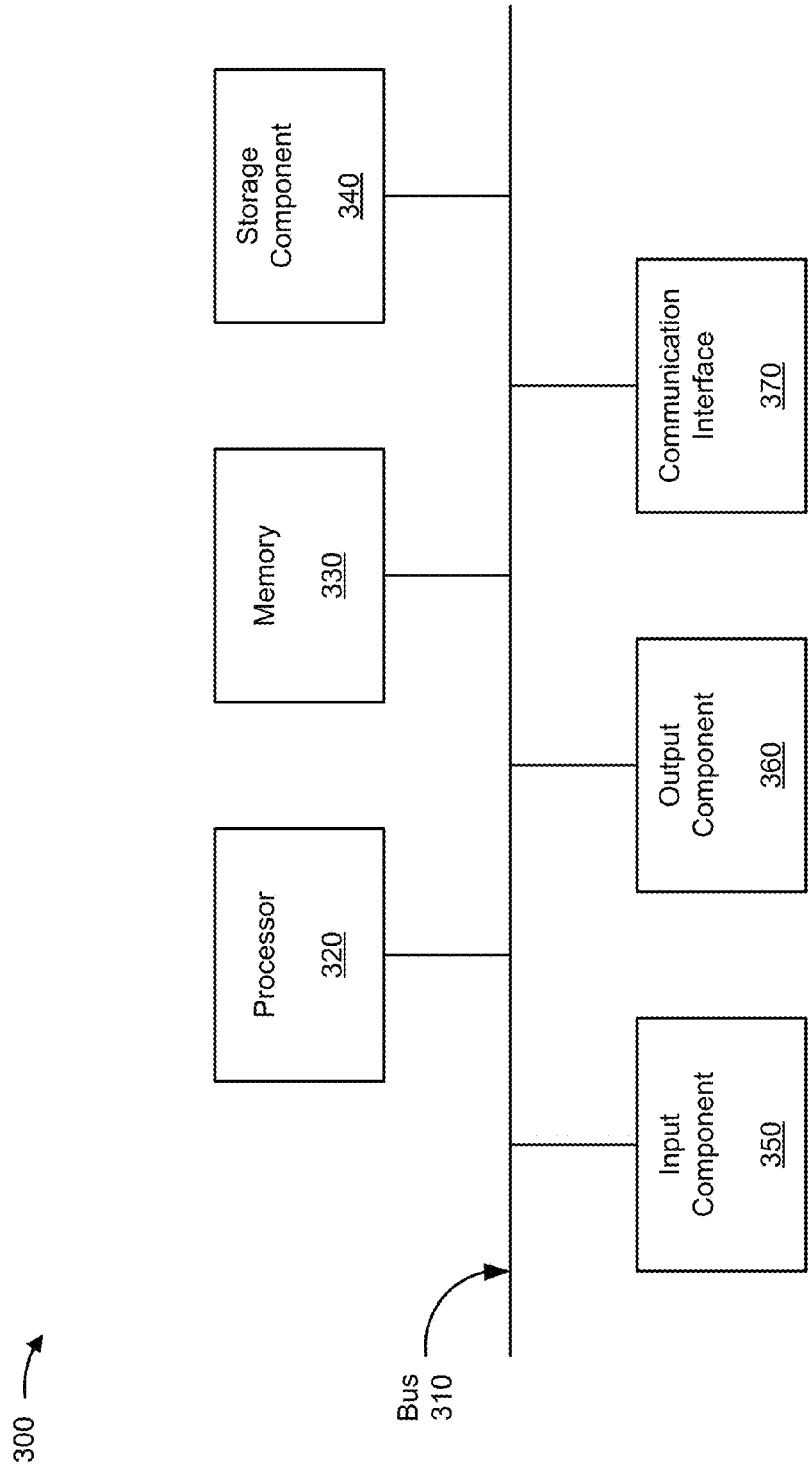
FIG. 3 is a diagram of example components of one or more devices of FIG. 2.

FIG. 3 is a diagram of example components of a device 300. Device 300 may correspond to client device 210, media client 220, display device 230, and/or remote control 240. In some implementations, client device 210, media client 220, display device 230, and/or remote control 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
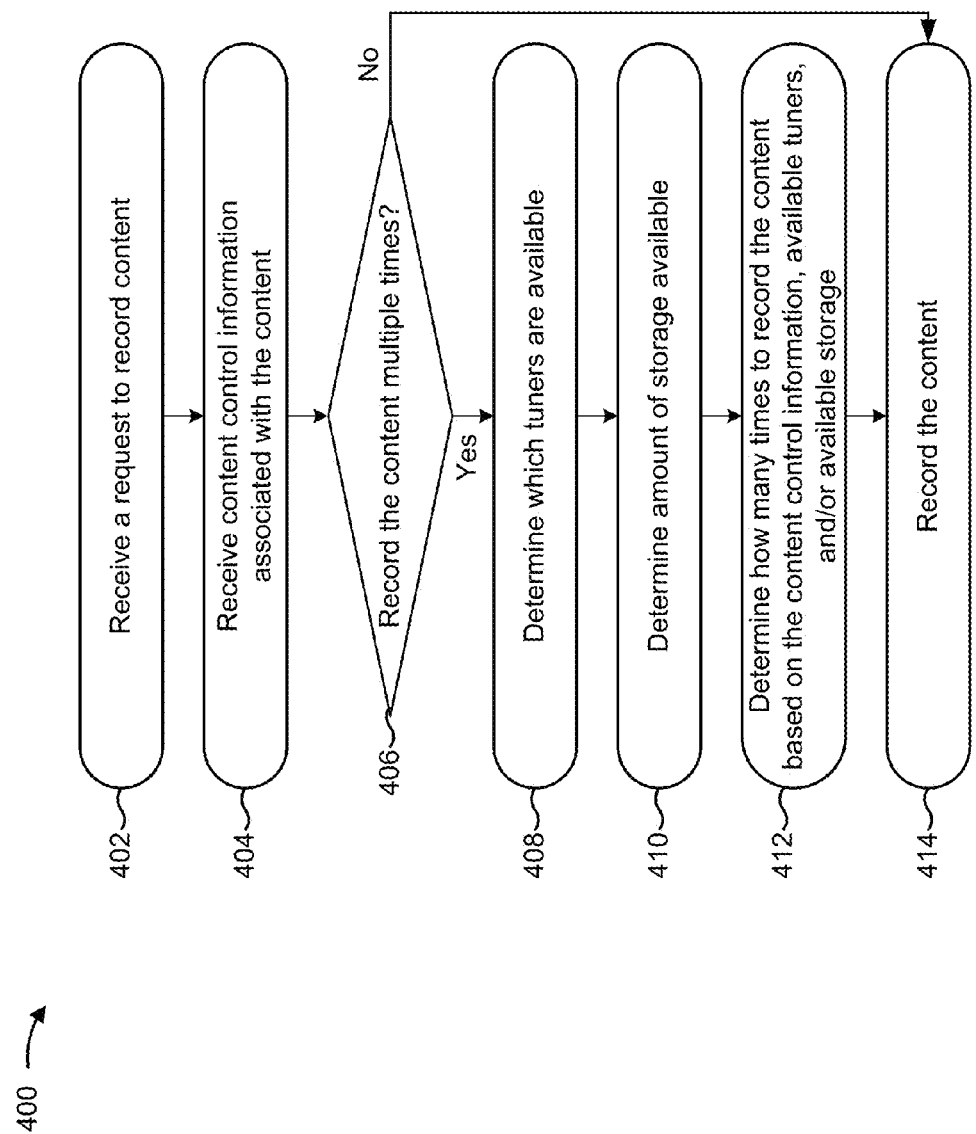
FIG. 4 is a flow chart of an example process for recording multiple copies of content.

FIG. 4 is a flow chart of an example process 400 for recording multiple copies of content. In some implementations, one or more process blocks of FIG. 4 may be performed by media client 220. Additionally, or alternatively, one or more process blocks of FIG. 4 may be performed by another device or a group of devices separate from or including media client 220, such as client device 210, display device 230, and/or remote control 240.

As shown in FIG. 4, process 400 may include receiving a request to record content. (block 402). For example, media client 220 may receive the request to record content from remote control 240 and/or client device 210.

In some implementations, a user may input an instruction into remote control 240 and/or client device 210 to record a particular content (e.g. a TV program, a movie, a sporting event, or the like). Remote control 240 and/or client device 210 may send a request to media client 220 to record the content based on the instruction. Media client 220 may receive the request.

As further shown in FIG. 4, process 400 may include receiving content control information associated with the content (block 404). For example, media client 220 may receive the content control information.

The content control information may include a permitted copy count, which may indicate a maximum quantity of copies of content that media client 220 is permitted to offer for check out based on a single recording of the content. For example, the permitted copy count may indicate that media client 220 is permitted to offer N number of copies of the content based on recording the content one time by one tuner.

In some implementations, the copy control information may indicate that only one copy of the content may be checked out by media client 220 (e.g., a permitted copy count of one). In such a case, media client 202 may be permitted to store one copy of the content and offer the one copy of the content for check out.

In some implementations, the copy control information may indicate that multiple copies of the content may be checked out by media client 220 (e.g., a permitted copy count of more than one). In such a case, media client 220 may store a single copy of the content, but offer the permitted quantity of copies for check out.

Further, as will be discussed in more detail later, the same content may be recorded multiple times (e.g., by multiple tuners) to store additional copies of the content, thus making additional copies of the content available to be checked out.

In some implementations, media client 220 may store a broadcast schedule in a memory included in or accessible by media client 220. The broadcast schedule may indicate a schedule of content to be broadcast to media client 220. The broadcast schedule may include scheduling information for each content to be broadcast. For example, the scheduling information may indicate a time at which the content is scheduled to be broadcast, a channel on which the content is scheduled to be broadcast, a description of the content scheduled to be broadcast (e.g., an episode name, actor information, production information, etc.), and/or other metadata for the content. The broadcast schedule may include the content control information for each content to be broadcast. Different content may have different content control information. Additionally, or alternatively, the broadcast schedule may indicate the content control information on a per channel basis (e.g., the same content control information may apply to all content broadcast on a same channel). Different channels may have different content control information.

Media client 220 may obtain the content control information, associated with the content to be recorded, from the broadcast schedule based on the request that indicates the content to be recorded.

As further shown in FIG. 4, process 400 may include determining whether the content should be recorded multiples times (block 406). For example, media client 220 may determine whether the content should be recorded multiple times based on the permitted copy count for the content and a requested copy count.

The requested copy count may indicate a quantity of copies of the content that should be offered for check out. In other words, the requested copy count may be a threshold value that indicates a minimum quantity of copies of the content that media client 220 should be permitted to offer for check out. In some implementations, the requested copy count may be a default value applied to any content to be recorded. In some implementations, the requested copy count may be set by a user of media client 220. In some implementations, the request to record the content may indicate the requested copy count for the content to be recorded. In some implementations, media client 220 may determine the requested copy count based on viewing habits of one or more users of medial client 220 and/or based on a history of content being checked out.

Media client 220 may determine whether the content should be recorded multiple times based on whether the requested copy count is less than or equal to the permitted copy count. If the requested copy count (e.g., a quantity of copies of the content to be offered for check out) is less than or equal to the permitted copy count (e.g., a quantity of copies of the content permitted to be offered for check out based on a single recording of the content), then media client 220 may determine to record the content one time (e.g., using one tuner) and determine not to record the content multiple times. In other words, if the requested copy count may be satisfied by a single recording of the content using one tuner, then the content may be recorded only one time. If media client 220 determines not to record the content multiple times (block 406—no), then process 400 may advance to block 414 and media client 220 may record the content one time using one tuner.

On the other hand, if the requested copy count is greater than the permitted copy count, then media client 220 may determine to record the content multiple times using multiple tuners. In other words, if the requested copy count may not be satisfied by a single recording of the content using one tuner, then media client 220 may determine that the content should be recorded multiple times (e.g., using multiple tuners) so more copies of the content may be offered for check out and so the requested copy count may be satisfied.

In some implementations, media client 220 may send a message to client device 210 and display a message on display device 230 asking a user if the user would like to record the content multiple times. If the user wants to record the content multiple times, the user may input a command to record the content multiple times into client device 210 and/or remote control 240. Client device 210 and/or remote control 240 may send media client 220 the command to record the content multiple times. Media client 220 may receive the command and determine to record the content multiple times based on the command.

As further shown in FIG. 4, if media client 220 determines to record the content multiple times (block 406—yes), process 400 may include determining which tuners are available (block 408). For example, media client 220 may determine which tuners are available to record the content.

Media client 220 may use multiple tuners to record the content multiple times. For example, the multiple tuners may each be tuned to the same channel to record the content. However, media client 220 may check to make sure multiple tuners are available to record the content.

In some implementations, media client 220 may determine which tuners included in media client 220 are available to record the content. For example, a tuner may be available to record the content if the tuner is not in use, or scheduled to be in use, at a time the content is to be recorded.

Additionally, or alternatively, media client 220 may determine whether tuners included in connected media clients 220 are available to record the content. For example, a user may have multiple media clients 220 associated with a same account and/or in a same household. The media clients 220 may be connected to each other such that the media clients 220 may communicate with one another and share resources. Accordingly, media client 220 may communicate with the connected media clients 220 to determine whether the connected media clients 220 have any tuners that are available to record the content.

As further shown in FIG. 4, process 400 may include determining an amount of storage available (block 410). For example, media client 220 may determine an amount of storage available in a memory included in or accessible by media client 220 for storing the content.

When media client 220 records the content multiple times, multiple copies of the content may be stored in a memory of media client 220. Accordingly, media client 220 may check to make sure there is enough storage available in the memory included in media client 220 to store the multiple copies of the content.

In some implementations, media client 220 may communicate with the connected media clients 220 to determine an amount of storage available among the connected media clients 220.

As further shown in FIG. 4, process 400 may include determining how many times to record the content based on the content control information, the available tuners, and/or the available storage (block 412). For example, media client 220 may determine how many times to record the content.

In some implementations, media client 220 may determine to record the content enough times so that a quantity of recordings (e.g., a recording count) multiplied by a permitted copy count for each recording is equal to or greater than the requested copy count. In other words, media client 220 may determine to record the content enough times (e.g., a recording count number of times) so that a requested quantity of copies of the content are available for check out.

In some implementations, media client 220 may check that it is possible to record the content the recording count number of times. For example, media client 220 may check whether enough tuners included in media client 220 are available to record the content the recording count number of times. Additionally, or alternatively, media client 220 may check whether enough storage is available in media client 220 to store a recording count number of copies of the content.

If enough tuners included in media client 220 are not available to record the content the recording count number of times and/or enough storage is not available in media client 220 to store the recording count number of copies, media client 220 may determine that a connected media client 220, with enough storage available to store one or more copies of the content, should record the content using an available tuner included in the connected media client 220. Accordingly, media client 220 may determine to record the content the recording count number of times using multiple media clients 220.

On the other hand, if enough tuners and/or storage is not available in media client 220 and/or connected media clients 220, media client 220 may determine to record the content fewer times than the recording count number of times.

Additionally, or alternatively, media client 220 may erase other content and/or cancel use of other tuners so that enough tuners and/or storage is available to record the content the recording count number of times. For example, media client 220 may erase a stored copy of another content to make more storage available. In some implementations, priority may be given to erasing a particular copy of content when multiple copies of the same content are stored over a copy of a content that is the only copy of the content stored. In this way, the most variety of content may still be stored by media client 220. Additionally, or alternatively, media client 220 may erase a stored copy of another content based on how long the content has been stored (e.g., an older content may be deleted before a newer content), based on where content falls on a priority list set by a user, based on whether the user indicated that the content should not be erased, whether the content has been played back by media client 220, and/or any combination of the above.

As further shown in FIG. 4, process 400 may include recording the content (block 414). For example, media client 220 may record the content and/or cause a connected media client 220 to record the content.

In some implementations, if media client 220 determined not to record the content multiple times (e.g., block 406—no), media client 220 may record the content one time, using a single tuner, and store a copy of the content in a memory included in media client 220. Alternatively, media client 220 may instruct a connected media client 220 to record the content one time and store a copy of the content in a memory included in the connected media client 220. The connected media client 220 may record the content based on the instruction from media client 220 and store the copy of the content.

In some implementations, media client 220 may record the content multiple times using multiple tuners (e.g., block 406—yes). For example, media client 220 may tune more than one tuner to the same channel and each tuner may be used to record a copy of the content. Additionally, or alternatively, media client 220 may instruct a connected media client 220 to record the content one or more times and store one or more copies of the content in a memory included in the connected media client 220. The connected media client may record the content based on the instruction from media client 220 and store the copy or copies of the content.

Accordingly, media client 220 may record the content one or more times and/or cause a connected media client 220 to record the content one or more times. Thus, media client 220 and/or the connected media client 220 may store one or more copies of the content. Likewise, for each copy of the content that is stored, one or more copies of the content may be offered for check out based on the content control information.

An offered copy count may refer to a quantity of copies of the content that media client 220 may offer for check out. In other words, the offered copy count may indicate a maximum quantity of copies of the content that are permitted to be checked out from media client 220 at any given time. In some implementations, the offered copy count may be equal to or greater than the quantity of copies stored by media client 220 and/or the connected media clients 220. For example, the offered copy count may be equal to the permitted copy count multiplied by the number of recordings of the content. The offered copy count (e.g., an actual quantity of copies of the content that may be offered for check out) may be the same as or different than the requested copy count (e.g., a requested quantity of copies of the content to be offered for check out).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
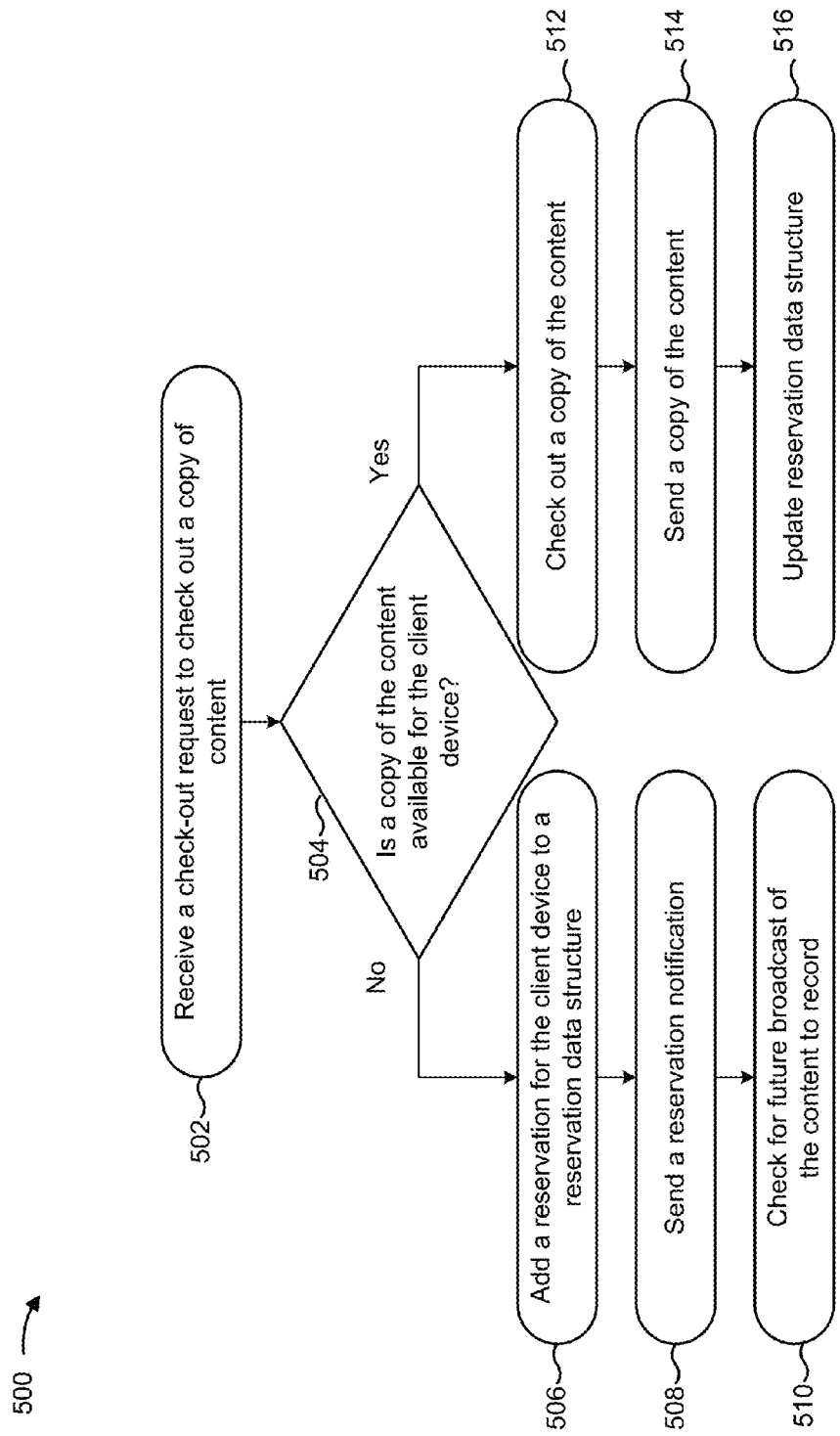
FIG. 5 is a flow chart of an example process for checking out a copy of the content.

FIG. 5 is a flow chart of an example process 500 for checking out a copy of content. In some implementations, one or more process blocks of FIG. 5 may be performed by media client 220. Additionally, or alternatively, one or more process blocks of FIG. 5 may be performed by another device or a group of devices separate from or including media client 220, such as client device 210, display device 230, and/or remote control 240.

As shown in FIG. 5, process 500 may include receiving a check-out request to check out a copy of content (block 502). For example, media client 220 may receive the check-out request from client device 210.

In some implementations, client device 210 may send a check-out request to media client 220. The check-out request may request that media client 220 send a copy of a content to client device 210. Media client 220 may receive the check-out request sent by client device 210.

As further shown in FIG. 5, process 500 may include determining if there is a copy of the content available for client device 210 (block 504). For example, media client 220 may determine if there is copy of the content available based on the check-out request.

In some implementations, media client 220 may store a checked-out count indicating a quantity of copies of the content that are currently checked out to client devices 210. Additionally, or alternatively, media client 220 may store a reserved count indicating a quantity of copies of the content that are currently reserved for check out to client devices 210.

In some implementations, media client 220 may store reservations for copies of the content. Accordingly, media client 220 may store a reservation data structure that includes entries for each reservation. Each entry may associate a client device identifier of a client device 210 that reserved a copy of the content, a status of the reservation, and an order of priority for the reservation. The status may indicate that media client 220 is currently holding a copy of the content for the associated client device 210 (e.g., a holding status) or that media client 220 is waiting for a copy of the content to be checked in to be held for the associated client device 210 (e.g., a waiting status). The reserved count may include reservations having a holding status and/or a waiting status. The order of priority may indicate an order in which reservations should be fulfilled.

A copy of the content may be available to client device 210 in at least two ways. First, a copy of the content may be available to client device 210 if a sum of the checked-out count and the reserved count is less than the offered copy count. In other words, if a quantity of copies of the content that are currently checked out or reserved to be checked out is less than the quantity of copies of the content that media client 220 is permitted to offer, then a copy of the content may be available to be checked out to the requesting client device 210.

Second, a copy of the content may be available to client device 210 if client device 210 has a reservation for a copy of the content and the reservation has a holding status. In other words, if media client 220 has a reservation associated with the requesting client device 210 and the status of the reservation indicates that media client 220 is currently holding a copy of the content, then a copy of the content may be available to be checked out to the requesting client device 210.

Accordingly, media client 220 may determine that a copy of the content is available to check out to client device 210 based on a sum of the checked-out count and the reserved count being less than the offered copy count, or based on client device 210 having a reservation for a copy of the content in a holding status.

On the other hand, media client 202 may determine that a copy of the content is not available to check out to client device 210 based a sum of the checked-out count and the reserved count being greater than or equal to the offered copy count and based on client device 210 not having a reservation for a copy of the content in a holding status.

As further shown in FIG. 5, if there is not a copy of the content available for client device 210 (block 504—no), process 500 may include adding a reservation for client device 210 to the reservation data structure (block 506). For example, media client 220 may add the reservation for client device 210 to the reservation data structure.

In some implementations, media client 220 may send a message to client device 210 informing a user of client device 210 that a copy of the content is not available for check out and asking the user if the user would like to reserve a copy of the content when a copy of the content becomes available. If the user wants to reserve a copy of the content, the user may input a command to reserve a copy of the content into client device 210. Client device 210 may send, to media client 220, the command to reserve a copy of the content. Media client 220 may receive the command and add a reservation to the reservation data structure based on the command.

Media client 220 may add a reservation for client device 210 to the reservation data structure by creating an entry for the reservation that includes a client device identifier for client device 210, a status of waiting, and an order of priority based on other currently pending reservations. For example, copies of the content may be reserved on a first-come, first-serve basis such that newly added reservations are given the lowest priority. Additionally, or alternatively, the order of priority may be determined based on the client device 210 for which the reservation is made (e.g., a parent's client device 210 may be given priority over a child's client device 210) and/or the type of client device 210 for which the reservation is made (e.g., a tablet computer may be given priority over a phone).

In some implementations, media client 220 may increment the reserved count based on adding the reservation to the reservation data structure. For example, media client 220 may increase the reserved count to indicate that a copy of the content is to be held for client device 210 when a copy of the content becomes available.

As further shown in FIG. 5, process 500 may include sending a reservation notification (block 508). For example, media client 220 may send the reservation notification to client device 210.

The reservation notification may indicate that a copy of the content is not currently available to send to client device 210, that a copy of the content will be held for client device 210 when a copy of the content becomes available, an order of priority of a reservation for client device 210 (e.g., a place in a queue), and/or that client device 210 will be notified when a copy of the content becomes available for client device 210. Additionally, or alternatively, the reservation notification may give the user an option to change the order of priority for the reservation (e.g., by requiring the user to enter a password). Client device 210 may receive the reservation notification and present the notification to a user of client device 210.

As further shown in FIG. 5, process 500 may include checking for a future broadcast of the content to record (block 510). For example, media client 220 may check for future broadcasts of the content to record.

A reservation being present in the reservation data structure may indicate that there are not enough copies of the content available for check out to meet the demand for requested copies of the content (even if the offered copy count is greater than or equal to the requested copy count). Accordingly, media client 220 may search the broadcast schedule for another broadcast of the content at a future time (e.g., a rebroadcast of the content or a rerun of the content). If media client 220 finds another broadcast of the content indicated by the broadcast schedule, then media client 220 may record the other broadcast or schedule a recording of the other broadcast. Recording the other broadcast of the content may be subject to available tuners and/or storage at the time of the broadcast, as described in FIG. 4.

Accordingly, media client 220 may store another copy of the content by recording the future broadcast and be permitted to offer more copies of the content for check out. In other words, media client 220 may search for another broadcast of the content and record another copy of the content (thus increasing the offered copy count) based on not enough copies of the content being available for check out.

As further shown in FIG. 5, if there is a copy of the content available for client device 210 (block 504—yes), process 500 may include checking out a copy of the content (block 512). For example, media client 220 may check out a copy of the content to client device 210.

In some implementations, media client 220 may check out a copy of the content by incrementing the checked-out count. For example, media client 220 may increase the checked-out count to indicate that a copy of the content is being checked out to client device 210.

As further shown in FIG. 5, process 500 may include sending a copy of the content (block 514). For example, media client 220 may send a copy of the content to client device 210.

In some implementations, media client 220 may send a stored copy of the content to client device 210. Alternatively, if permitted by the copy control information, media client 220 may create a copy of a stored copy of the content and send the created copy of the content to client device 210. Media client 220 may send a copy of the content by streaming the copy of the content, uploading the copy of the content to the cloud (e.g., a server device) where client device 210 may retrieve the copy of the content, and/or send the copy of the content to another device where client device 210 may retrieve the copy of the content.

Client device 210 may receive the copy of the content and store the copy of the content in a memory included in or accessible by client device 210. Client device 210 may present the copy of the content to a user of client device 210.

As further shown in FIG. 5, process 500 may include updating the reservation data structure (block 516). For example, media client 220 may update the reservation data structure based on sending a copy of the content to client device 210.

If the copy of the content is sent to a client device 210 that had a reservation in the reservation data structure, media client 220 may remove the entry for the reservation from the reservation data structure. Media client 220 may also update the order of priority of other reservations included in the reservation data structure based on the reservation for client device 210 being removed.

In some implementations, if the copy of the content is sent to a client device 210 that had a reservation in the reservation data structure, the reserved count may be decremented. For example, media client 220 may decrease the reserved count to indicate that one less copy of the content is being reserved.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
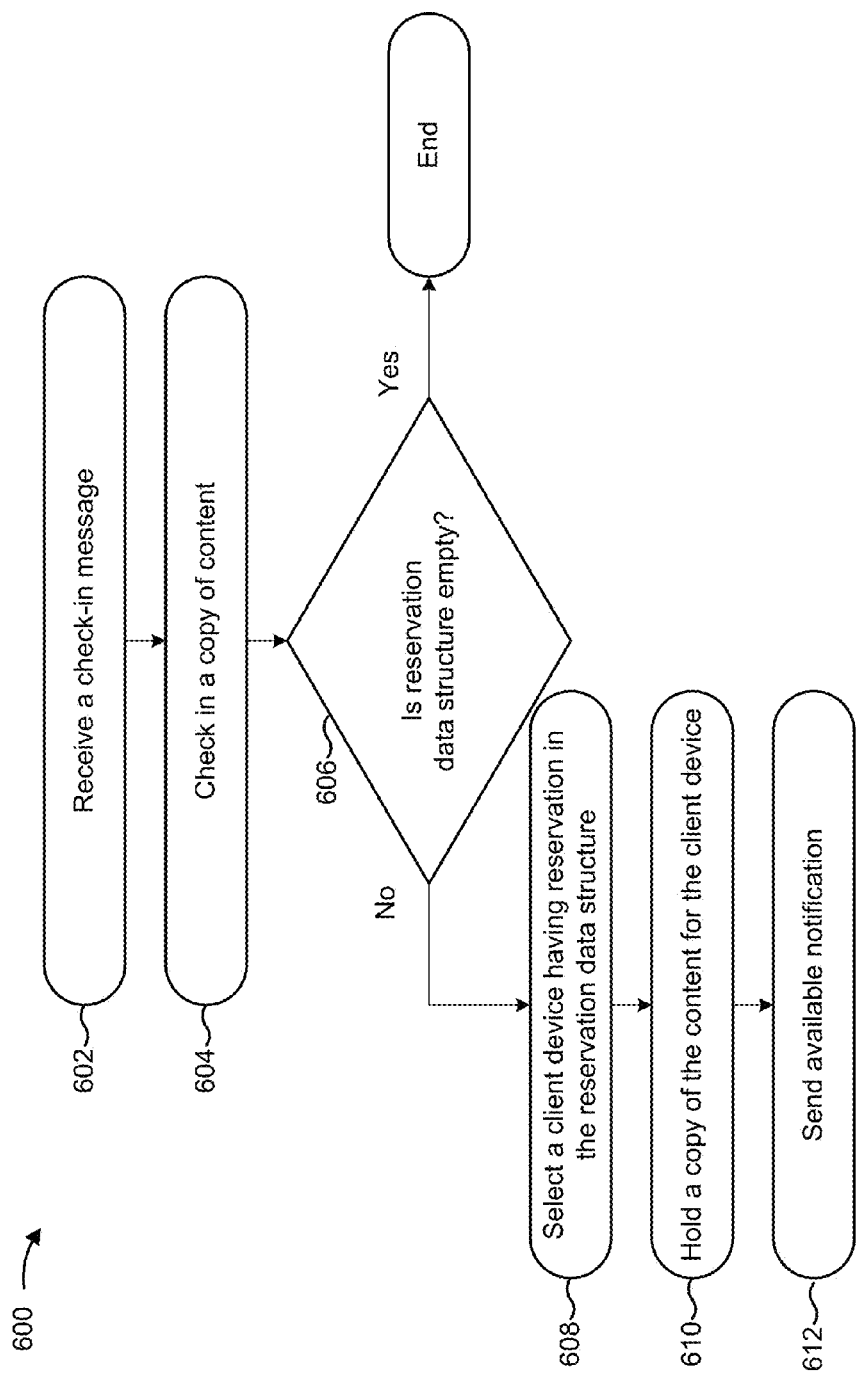
FIG. 6 is a flow chart of an example process for checking in a copy of the content.

FIG. 6 is a flow chart of an example process 600 for checking in a copy of content. In some implementations, one or more process blocks of FIG. 6 may be performed by media client 220. Additionally, or alternatively, one or more process blocks of FIG. 6 may be performed by another device or a group of devices separate from or including media client 220, such as client device 210, display device 230, and/or remote control 240.

As shown in FIG. 6, process 600 may include receiving a check-in message (block 602). For example, media client 220 may receive the check-in message from client device 210.

Client device 210 may send the check-in message to media client 220 for checking in a copy of a content. The check-in message may include all or part of the copy of the content itself. Accordingly, when the check-in message is sent to media client 220, the copy of the content will be removed from client device 210. In some implementations, client device 210 may delete the copy of the content from the memory storing the copy of the content, and the check-in message may include a confirmation that the copy of the content has been deleted by client device 210. In some implementations, client device 210 may automatically send the check-in message to media client 220 based on client device 210 completing play back of the copy of the content. Additionally, or alternatively, client device 210 may send the check-in message based on user input.

Media client 220 may receive the check-in message sent by client device 210.

As further shown in FIG. 6, process 600 may include checking in a copy of the content (block 604). For example, media client 220 may check in a copy of the content based on the check-in message.

In some implementations, media client 220 may check in a copy of the content by decrementing the checked-out count. For example, media client 220 may decrease the checked-out count to indicate that a copy of the content has been checked in from client device 210 and one less copy of the content is checked out.

As further shown in FIG. 6, process 600 may include determining whether the reservation data structure is empty (block 606). For example, media client 220 may determine whether the reservation data structure is empty.

If the reservation data structure does not include an entry for a reservation of a copy of the content, then media client

220 may determine that the reservation data structure is empty. If the reservation data structure is empty (block 606—yes), then process 600 may end. Accordingly, the copy of the content that was checked in may be made available to a client device 210 that sends the next check-out request for a copy of the content.

On the other hand, if the reservation data structure includes an entry for a reservation of a copy of the content, then media client 220 may determine that the reservation data structure is not empty.

As further shown in FIG. 6, if the reservation data structure is not empty (block 606—no), process 600 may include selecting a client device 210 that has a reservation in the reservation data structure (block 608). For example, media client 220 may select client device 210 from the reservation data structure.

In some implementations, media client 220 may select a client device 210 from the reservation data structure based on a status and/or a priority of a reservation for the client device 210. For example, media client 220 may select a client device 210 associated with a reservation in a waiting status and having the highest priority. For instance, media client 220 may select a client device 210 that was the earliest to send a check-out request and that does not have a copy of the content currently being held for the client device 210.

As further shown in FIG. 6, process 600 may include holding a copy of the content for client device 210 (block 610). For example, media client 220 may hold a copy of the content for the selected client device 210.

In some implementations, media client 220 may hold a copy of the content by allowing the copy of the content to be sent only to the selected client device 210 and not to any other client device 210 that requests to check-out a copy of the content.

Furthermore, media client 220 may update the reservation data structure to update the status of the reservation for the selected client device 210. For example, media client 220 may change the status of the reservation from a waiting status to a holding status.

In some implementations, media client 220 may hold the copy of the content for client device 210 for a particular amount of time. If client device 210 does not check out the copy of the content within the particular amount of time, media client 220 may stop holding the copy of the content for client device 210. For example, media client 220 may remove the reservation for the reservation data structure after the particular amount of time expires, and select another client device 210 from the reservation data structure for which to hold a copy of the content. Alternatively, media client 220 may change the status of the reservation from a holding status to a waiting status, and select another client device 210 from the reservation data structure for which to hold a copy of the content. In such a case, media client 220 may also change the priority of the reservation for the client device 210 that did not check out the copy of the content within the particular amount of time. For example, the priority may be changed to the lowest priority in the reservation data structure or changed to another priority.

As further shown in FIG. 6, process 600 may include sending an available notification (block 612). For example, media client 220 may send an available notification to the selected client device 210.

The available notification may indicate that a copy of the content is available to be checked out to the selected client device 210. The available notification may also indicate the particular amount of time that client device 210 has to check out the copy of the content before the copy of the content will be held for another client device 210. Client device 210 may receive the available notification and present the available notification to a user of client device 210.

In some implementations, the user may input an instruction to cancel the reservation based on the available notification. Client device 210 may send the instruction to cancel the reservation to media client 220, and media client 220 may receive the instruction to cancel the reservation. Media client 220 may remove the reservation for client device 210 from the reservation data structure based on the instruction and select another client device 210 from the reservation data structure for which to hold a copy of the content (e.g., process 600 may return to block 608).

On the other hand, the user may input an instruction to check out the copy of the content based on the available notification. In such a case, client device 210 may send a check-out request to media client 220 and process 600 may advance to block 502 of FIG. 5 to check out a copy of the content.

In some implementations, media client 220 may automatically send a copy of the content to client device 210 when a copy of the content is available to be checked out to client device 210 rather than, or in addition to, sending the available notification.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7E are diagrams of an example implementation 700 relating to example processes 400-600 shown in FIGS. 4-6. FIGS. 7A-7E show an example of recording multiple copies of content, checking out a copy of the content, and checking in a copy of the content.

Figure 7A:
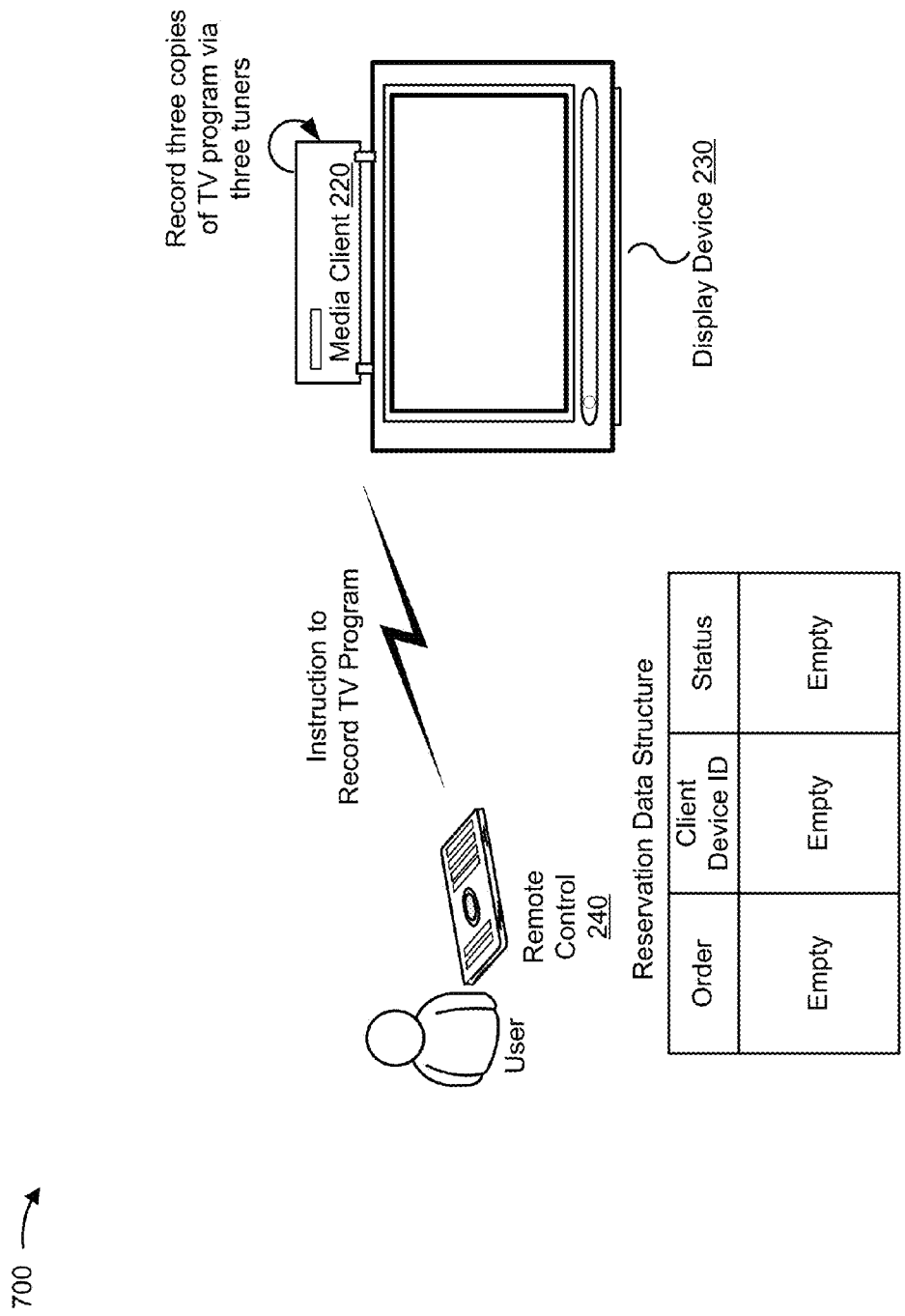
FIGS. 7A-7E are diagrams of an example implementation relating to the example process shown in FIGS. 4-6.

As shown in FIG. 7A, a user may use remote control 240 to send an instruction to record a TV program to media client 220. Media client 220 may receive the instruction and obtain copy control information for the TV program from a broadcast schedule stored by media client 220.

Assume the copy control information indicates a permitted copy count of one copy for the TV program. In other words, assume media client 220 is permitted to offer one copy of the TV program for check out based on a single recording of the content. Moreover, assume a requested copy count is three copies. For example, assume that the requested copy count is a default value stored by media client 220 that applies to all recorded content.

Accordingly, because the permitted copy count is one copy and the requested copy count is three copies, media client 220 may determine to record the TV program three times via three tuners so that three copies of the content may be offered for check out. Assume media client 220 checks for available tuners and available storage and determines there are three tuners available to record the content and enough storage to store three copies of the TV program. Thus, as shown in FIG. 7A, media client 220 may record three copies of the TV program via three tuners and store three copies of the TV program. Consequently, the offered copy count may be three copies (e.g., three recordings of the TV program multiplied by one permitted copy per recording equals three copies that media client 220 is permitted to offer for check out).

As further shown in FIG. 7A, assume media client 220 stores a reservation data structure for the TV program. Further, assume the reservation data structure is empty at the time the TV program is recorded.

Figure 7B:
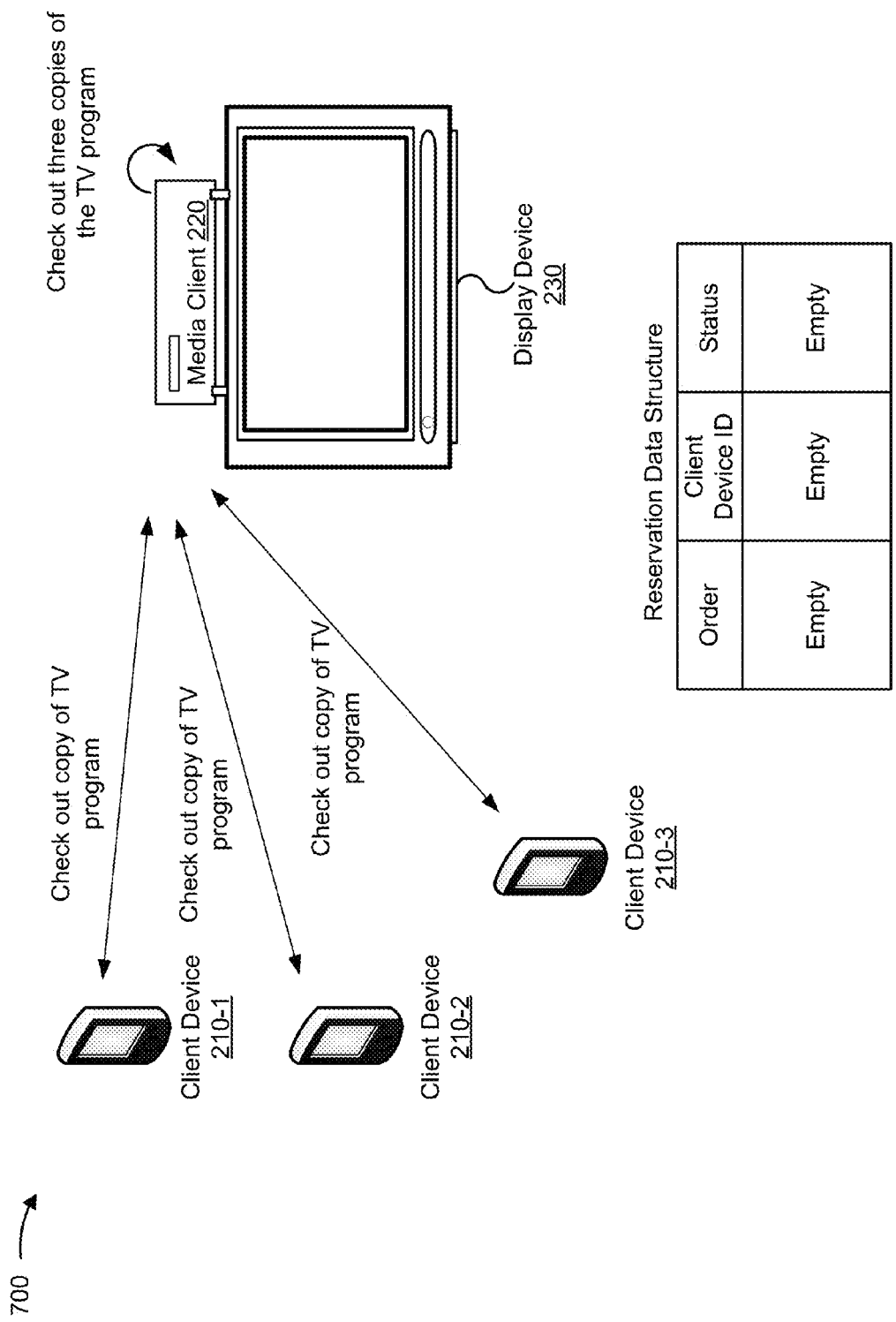

In FIG. 7B, assume client devices 210-1 to 210-3 each sends a check-out request to media client 220 to check out a copy of the TV program. Media client 220 may determine that three copies of the TV program are available for check out and check out three copies of the TV program to client devices 210-1 to 210-3. For example, media client 220 may determine that three copies of the TV program are available based on the offered copy count being three copies and no copies of the TV program currently being checked out or reserved. Media client 220 may send a copy of the TV program to each of client devices 210-1 to 210-3. Media client 220 may update a checked-out count to three to indicate that three copies of the TV program are currently checked out.

As further shown in FIG. 7B, the reservation data structure may still be empty because no reservations have been created.

Figure 7C:
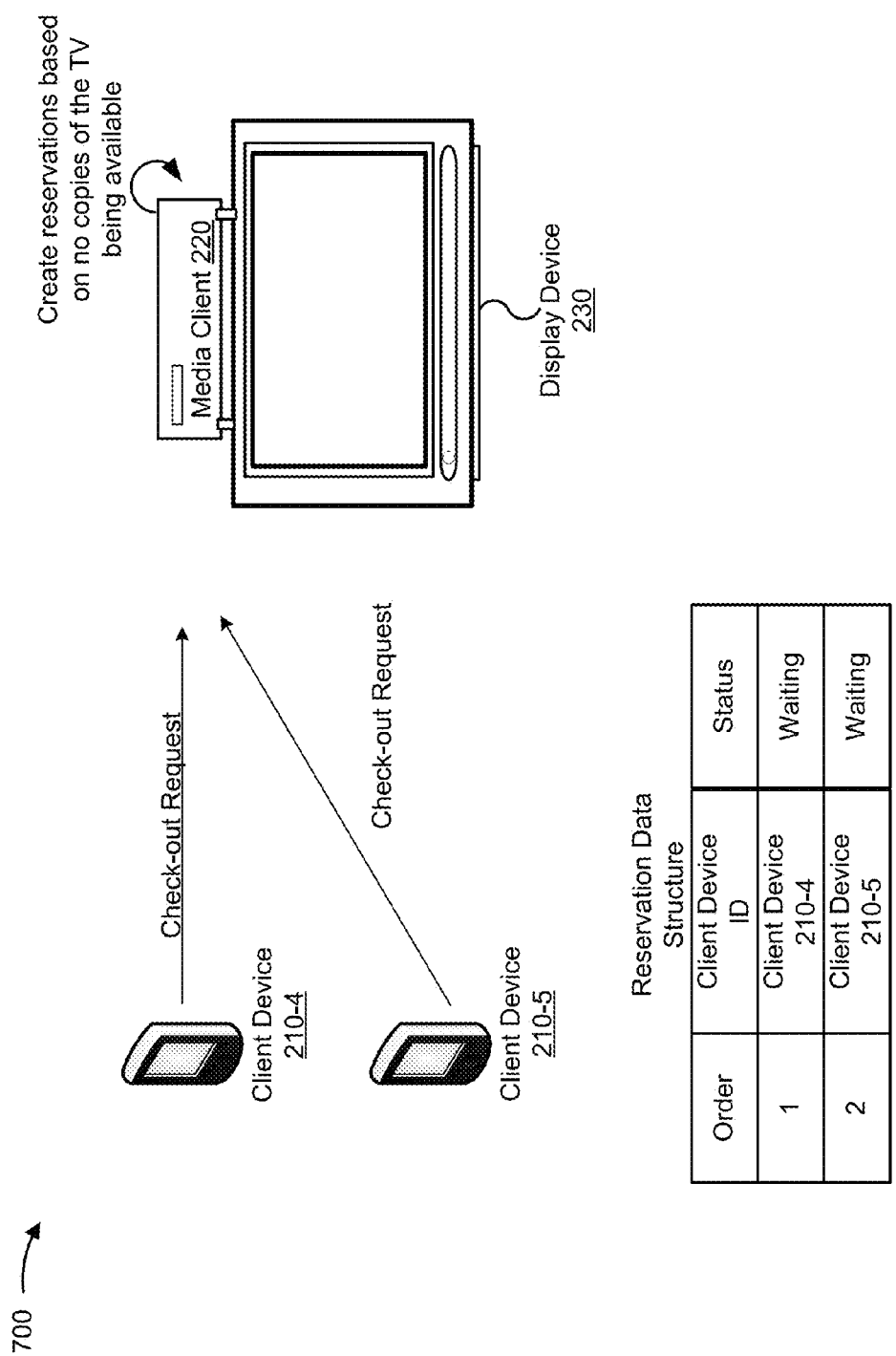

As shown in FIG. 7C, assume client devices 210-4 and 210-5 each sends a check-out request to media client 220 to check out a copy of the TV program. Media client 220 may determine that no copies of the TV program are available to check out to client devices 210-4 and 210-5 because the offered copy count of three is equal to the checked-out count of three. In other words, media client 202 may determine that all the copies that are permitted to be checked out are already checked out to other devices.

Accordingly, media client 220 may add a first reservation to the reservation data structure for client device 210-4. The first reservation may indicate an order of priority of one, a client device identifier (ID) for client device 210-4, and a status of waiting. Likewise, media client 220 may add a second reservation to the reservation data structure for client device 210-5. The second reservation may indicate an order of priority of two, a client device ID for client device 210-5, and a status of waiting.

Figure 7D:
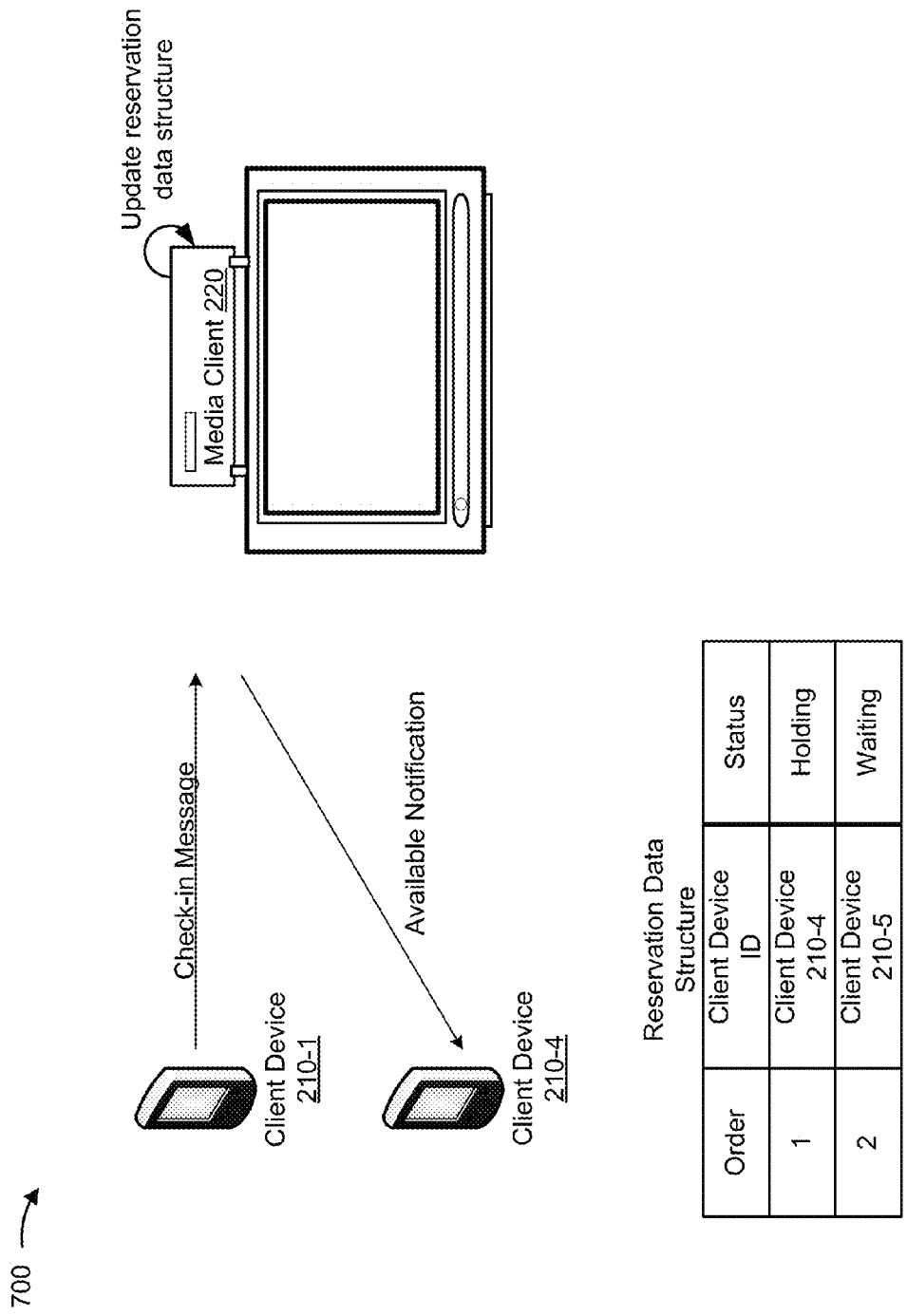

As shown in FIG. 7D, assume client device 210-1 sends a check-in message to media client 220 checking in a copy of the TV program. Media client 220 may receive the check-in message and update the checked-out count to be two based on the copy of the TV program being checked in.

Furthermore, media client 220 may determine that the reservation data structure is not empty, and that the reservation data structure includes the first reservation and the second reservation. Media client 220 may select client device 210-4 for which to hold a copy of the TV program based on client device 210-4 being associated with the first reservation, which has the highest order of priority with a waiting status.

Media client 220 may send an available notification to client device 210-4 indicating that a copy of the TV program is now available for client device 210-4 to check out. As further shown in FIG. 7D, media client 220 may update the status of the first reservation in the reservation data structure to indicate a holding status because a copy of the TV program is currently being held for client device 210-4.

Figure 7E:
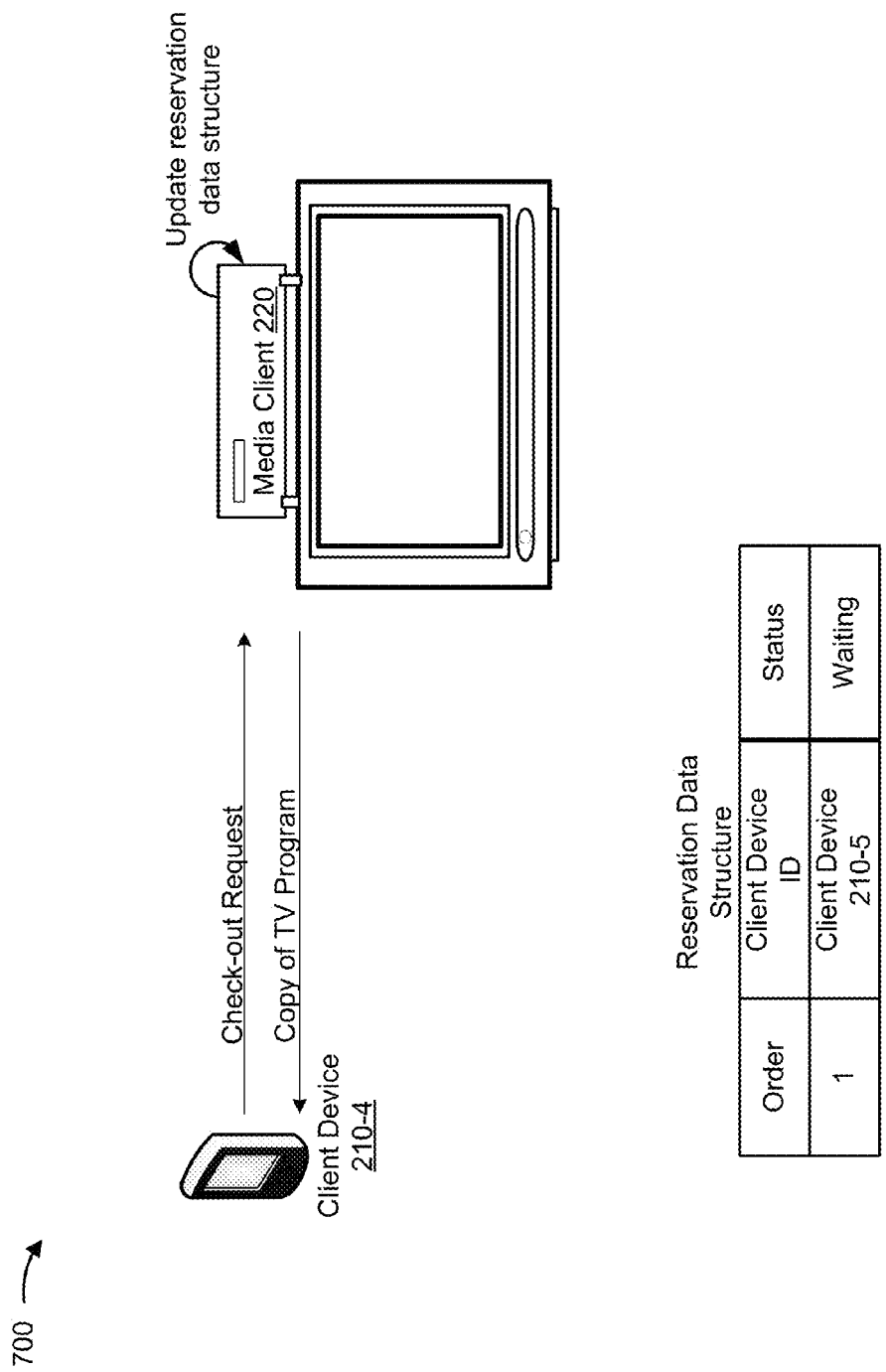

As shown in FIG. 7E, client device 210-4 may resend a check-out request to media client 220 to check out a copy of the TV program. Media client 220 may receive the check-out request and determine that a copy of the TV program is being held for client device 210-4. Media client 220 may send a copy of the TV program to client device 210-4 and update the checked-out count to be three based on three copies of the TV program being checked out.

As further shown in FIG. 7E, media client 220 may update the reservation data structure by removing the first reservation for client device 210-4 based on a copy of the TV program being sent to client device 210-4. The order of priority for the second reservation for client device 210-5 may also be updated to indicate a priority of one. Accordingly, the next time a copy of the TV program is checked in, a copy of the TV program may be held for client device 210-5.

As indicated above, FIGS. 7A-7E are provided merely as an example. Other examples are possible and may differ from what was described with regard to FIGS. 7A-7E.

Some implementations described herein may record the same content multiple times, via multiple tuners, to increase the quantity of copies permitted to be offered for check out to client devices. Accordingly, more copies of the content may be checked out, thereby reducing the risk that a copy of the content will not be available for check out. Furthermore, some implementations described herein may reserve a copy of a content for a client device when a permitted quantity of copies are already checked out so that the client device may check out a copy of the content when a copy of the content becomes available.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive a request to record content;
receive copy control information associated with the content that indicates a first quantity of copies of the content that the device is permitted to make available for check out from each recording of the content;
determine to record the content a plurality of times based on the first quantity of copies failing to satisfy a particular value;
record the content the plurality of times using a plurality of tuners based on the request; and
make a second quantity of copies of the content available for check out to at least one client device based on recording the content the plurality of times,
the second quantity of copies being greater than the first quantity of copies.

2. The device of claim 1, where the one or more processors, when determining to record the content the plurality of times, are to:
determine an amount of memory available; and
determine to record the content the plurality of times based on the amount of memory available being sufficient to store a number of copies of the content equal to the plurality of times the content is recorded.

3. The device of claim 1, where the one or more processors, when determining to record the content the plurality of times, are to:
determine an amount of tuners that are available to record the content; and
determine to record the content the plurality of times based on the amount of tuners that are available being sufficient to record the content the plurality of times.

4. The device of claim 1, where the one or more processors are further to:
check out a copy of the content, from among the second quantity of copies of the content, to a client device of the at least one client device.

5. The device of claim 1,
where the one or more processors are further to:
provide a message to a user that asks the user whether the content should be recorded the plurality of times,
the message being provided to the user based on the first quantity of copies failing to satisfy the particular value; and
receive a reply to the message including an instruction to record the content the plurality of times; and
where the one or more processors, when recording the content the plurality of times, are to:
record the content the plurality of times based on the instruction.

6. The device of claim 1, where the particular value is set by a user.

7. The device of claim 1, where the request indicates the particular value.

8. A non-transitory computer-readable medium storing instructions, the instructions comprising:
one or more instructions that, when executed by one or more processors of a media device, cause the one or more processors to:
determine copy control information associated with a content that indicates a first quantity of copies of the content that the media device is permitted to make available for check out from each recording of the content;
determine to record the content a plurality of times based on the first quantity of copies failing to satisfy a particular value;
cause the content to be recorded the plurality of times using a plurality of tuners based on a request and the copy control information; and
store at least one copy of the content based on causing the content to be recorded,
a second quantity of copies of the content being offered for check out from the media device based on the at least one stored copy of the content;
receive, from a client device, a request to check out a copy of the content from among the second quantity of copies of the content;
determine that none of the second quantity of copies of the content are available to be checked out;
reserve the copy of the content for the client device when the copy of the content becomes available for check out based on determining that none of the second quantity of copies of the content are available to be checked out; and
send the copy of the content to the client device when the copy of the content becomes available for check out based on the request and reserving the copy of the content.

9. The non-transitory computer-readable medium of claim 8,
where the one or more instructions, when executed by the one or more processors, further cause the one or more processors to:
provide a message to a user that asks the user whether the copy of the content should be reserved,
the message being provided to the user based on determining that none of the second quantity of copies of the content are available to be checked out; and
receive a reply to the message including an instruction to reserve the copy of the content; and
where the one or more instructions, that cause the one or more processors to reserve the copy of the content, cause the one or more processors to:
reserve the copy of the content based on the instruction.

10. The non-transitory computer-readable medium of claim 8, where the one or more instructions, that cause the one or more processors to determine that none of the second quantity of copies of the content are available to be checked out, cause the one or more processors to:
determine that none of the second quantity of copies of the content are available to be checked out based on at least one of the second quantity of copies being checked out to another client device.

11. The non-transitory computer-readable medium of claim 8, where the one or more instructions, that cause the one or more processors to determine that none of the second quantity of copies of the content are available to be checked out, cause the one or more processors to:
determine that none of the second quantity of copies of the content are available to be checked out based on at least one of the second quantity of copies being reserved for another client device.

12. The non-transitory computer-readable medium of claim 8,
where the one or more instructions, that cause the one or more processors to reserve the copy of the content, cause the one or more processors to:
create a reservation,
the reservation indicating a priority of the reservation and a status of the reservation; and
where the one or more instructions, that cause the one or more processors to send the copy of the content to the client device, cause the one or more processors to:
select the client device to which to send the copy of the content based on the priority of the reservation and the status of the reservation; and
send the copy of the content to the client device.

13. The non-transitory computer-readable medium of claim 8,
where the one or more instructions, when executed by the one or more processors, further cause the one or more processors to:
send a notification to the client device when the copy of the content becomes available; and
receive a reply to the notification from the client device; and
where the one or more instructions, that cause the one or more processors to send the copy of the content to the client device, further cause the one or more processors to:
send the copy of the content to the client device based on the reply.

14. The non-transitory computer-readable medium of claim 13,
where the one or more instructions, that cause the one or more processors to reserve the copy of the content, cause the one or more processors to:
reserve the copy of the content for a time period after sending the notification; and
where the one or more instructions, that cause the one or more processors to send the copy of the content to the client device, cause the one or more processors to:
send the copy of the content to the client device based on receiving the reply within the time period.

15. A method, comprising:
receiving, by a media device, a record request to record content;
receiving, by the media device, copy control information associated with the content that indicates a first quantity of copies of the content that the media device is permitted to make available for check out from each recording of the content;
determining, by the media device, to record the content a plurality of times based on the first quantity of copies failing to satisfy a particular value;
causing, by the media device, the content to be recorded the plurality of times using a plurality of tuners based on the record request;
storing, by the media device, a plurality of copies of the content based on recording the content the plurality of times,
a second quantity of copies of the content being offered for check out based on the stored plurality of copies of the content, and
the second quantity of copies being greater than the first quantity of copies;
receiving, by the media device, a check-out request from a client device to check out a copy of the content from among the second quantity of copies of the content;
determining, by the media device, that none of the second quantity of copies of the content are available to be checked out;
reserving, by the media device, the copy of the content for the client device when the copy of the content becomes available for check out based on determining that none of the second quantity of copies of the content are available to be checked out; and
sending, by the media device, the copy of the content to the client device when the copy of the content becomes available for check out based on the check-out request and reserving the copy of the content.

16. The method of claim 15, further comprising:
searching a broadcast schedule for a broadcast of the content based on determining that none of the second quantity of copies of the content are available to be checked out; and
recording the broadcast of the content,
a third quantity of copies of the content being offered for check out based on recording the broadcast of the content,
the third quantity of copies of the content being greater than the second quantity of copies of the content.

17. The method of claim 15, where causing the content to be recorded the plurality of times using the plurality of tuners comprises:
instructing a connected media device to record the content using a first tuner included in the connected media device,
the plurality of tuners including the first tuner.

18. The method of claim 17, where instructing the connected media device to record the content comprises:
instructing the connected media device to record the content based on a second tuner included in the media device not being available to record the content.

19. The method of claim 17, where instructing a connected media device to record the content comprises:
instructing the connected media device to record the content based on a sufficient amount of memory included in the media device not being available to store the content.

20. The method of claim 15, where causing the content to be recorded the plurality of times using the plurality of tuners comprises:
recording the content using a first tuner included in the media device; and
instructing a connected media client to record the content using a second tuner included in the connected media client,
the plurality of tuners including the first tuner and the second tuner.

* * * * *